(12) United States Patent
Roshanzamir et al.

(10) Patent No.: US 10,770,736 B2
(45) Date of Patent: Sep. 8, 2020

(54) VIA DESIGNS FOR REMOVING WATER IN FUEL CELL STACKS (71) Applicants: Daimler AG, Stuttgart (DE); Ford Motor Company, Dearborn, MI (US)

(72) Inventors: Alireza Roshanzamir, Burnaby (CA); Yunsong Yang, Surrey (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 91 days.

(21) Appl. No.: 16/165,004

(22) Filed: Oct. 19, 2018

(65) Prior Publication Data
US 2019/0123363 A1   Apr. 25, 2019

Related U.S. Application Data (60) Provisional application No. 62/577,136, filed on Oct. 25, 2017.

(51) Int. Cl.
*H01M 8/0258* (2016.01)
*H01M 8/1018* (2016.01)
*H01M 8/04291* (2016.01)
*H01M 8/04828* (2016.01)
*H01M 8/04119* (2016.01)

(52) U.S. Cl.
CPC ..... *H01M 8/0258* (2013.01); *H01M 8/04156* (2013.01); *H01M 8/04171* (2013.01); *H01M 8/04291* (2013.01); *H01M 8/04835* (2013.01); *H01M 8/1018* (2013.01); *H01M 2008/1095* (2013.01); *H01M 2300/0082* (2013.01)

(58) Field of Classification Search
CPC .......... H01M 8/0258; H01M 8/04156; H01M 8/04171; H01M 8/04291; H01M 8/04835; H01M 8/1018; H01M 2008/1095; H01M 2300/0082
See application file for complete search history.

(56) References Cited

U.S. PATENT DOCUMENTS

| | | | | |
|---|---|---|---|---|
| 5,631,099 A * | 5/1997 | Hockaday | ......... | H01M 8/04291 429/460 |
| 6,024,848 A * | 2/2000 | Dufner | ...................... | C25B 9/08 204/252 |
| 9,279,073 B2 | 3/2016 | Bleecher et al. | | |
| 2009/0286133 A1* | 11/2009 | Trabold | .............. | H01M 8/0228 429/429 |
| 2011/0171564 A1 | 7/2011 | Blunk et al. | | |
| 2013/0089809 A1* | 4/2013 | Farrington | .......... | H01M 8/0297 429/492 |
| 2018/0040905 A1* | 2/2018 | Wilkosz | ............... | B23K 26/352 |

* cited by examiner

*Primary Examiner* — Susan D Leong
(74) *Attorney, Agent, or Firm* — Stephan A. Pendorf; Patent Central LLC (57) ABSTRACT

Structures and methods are disclosed for removing water, and particularly for preventing ice blockages, in solid polymer electrolyte fuel cells comprising reactant vias that fluidly connect a reactant transition region to a reactant port. Water can be removed from the reactant via by making its surface superhydrophobic while incorporating at least one additional via with a hydrophilic surface in parallel therewith.

19 Claims, 5 Drawing Sheets

VIA DESIGNS FOR REMOVING WATER IN FUEL CELL STACKS

BACKGROUND

Field of the Invention

This invention relates to structures and methods for removing water in solid polymer electrolyte fuel cell stacks. In particular, it relates to removing water to prevent ice blockages in fuel cells subjected to below freezing temperatures.

Description of the Related Art

Fuel cells electrochemically convert fuel and oxidant reactants, (e.g. hydrogen and oxygen or air respectively), to generate electric power. One type of fuel cell is a solid polymer electrolyte fuel cell which employs a proton conducting polymer membrane electrolyte between cathode and anode electrodes. The electrodes contain appropriate catalysts and typically also comprise conductive particles, binder, and material to modify wettability. A structure comprising a proton conducting polymer membrane sandwiched between two electrodes is known as a membrane electrode assembly (MEA). Such assemblies can be prepared in an efficient manner by appropriately coating catalyst mixtures onto the polymer membrane, and thus are commonly known as catalyst coated membranes (CCMs). For purposes of handling, assembly, and electrical insulation, CCMs are often framed with suitable electrically insulating plastic frames.

Anode and cathode gas diffusion layers are usually employed adjacent their respective electrodes on either side of a catalyst coated membrane. The gas diffusion layers serve to unifouuly distribute reactants to and remove by-products from the catalyst electrodes. Fuel and oxidant flow field plates are then typically provided adjacent their respective gas diffusion layers and the combination of all these components represents a typical individual fuel cell assembly. The flow field plates comprise flow fields that usually contain numerous fluid distribution channels. The flow field plates serve multiple functions including: distribution of reactants to the gas diffusion layers, removal of by-products therefrom, structural support and containment, and current collection.

Water and heat are the primary by-products in a cell operating on hydrogen and air reactants. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields are typically formed on the electrochemically inactive surfaces of both the anode side and cathode side flow field plates and, by appropriate design, a sealed coolant flow field is created when both anode and cathode side plates are mated together into a bipolar plate assembly.

Because the output voltage of a single cell is of order of 1V, a plurality of cells is usually stacked together in series for commercial applications in order to provide a higher output voltage. Fuel cell stacks can be further connected in arrays of interconnected stacks in series and/or parallel for use in automotive applications and the like.

To provide both reactants and the coolant to and from the individual cells in the stack, a series of ports are generally provided at opposing ends of the individual cells such that when the cells are stacked together they form manifolds for these fluids. Further required design features then include passageways in the plates to distribute the bulk fluids in these formed manifolds to and from the various channels in the reactant and coolant flow fields in the plates. These passageway regions can include regions known as transition regions that are fluidly connected to the flow field channels in the flow field plates. The transition regions themselves can comprise numerous fluid distribution features. In addition, the passageway regions can include a series of vias that fluidly connect such transition regions to their appropriate reactant ports.

In fuel cell stacks subject to freezing temperatures, accumulations of liquid water can be problematic because, when the water freezes, the ice formed can undesirably block fluid flows and the associated expansion of the solid ice can cause damage to cells in the fuel cell stack. Significant sized accumulations of liquid water which may be subject to freezing are therefore generally avoided, either by preventing accumulation in the first place or alternatively by removing them before they have the opportunity to freeze. For these and other reasons, various designs and techniques are disclosed in the art for managing and controlling water movement within a fuel cell stack.

US20110171564 for instance discloses one approach for addressing problems caused by water condensation during operation or shut down that results in reactant gas flow fields or tunnels being blocked by retained water or ice. One exemplary embodiment therein includes a fuel cell bipolar plate having a reversible superhydrophilic-superhydrophobic coating thereon. Another exemplary embodiment therein includes a fuel cell bipolar plate including a reactant gas header opening communicating with a first portion including a plurality of tunnels defined therein, the first portion communicating with a reactant gas flow field having a plurality of channels defined therein, and a superhydrophilic-superhydrophobic coating over at least a portion of the tunnels.

Despite the advances made to date, there remains a need for better designs and methods to prevent water blockages from occurring in such fuel cell stacks, and particularly to prevent ice blockages when subzero temperatures may be encountered. This invention fulfills these needs and provides further related advantages.

SUMMARY

The present invention provides for improvements in the removal of water and in the prevention of ice blockages in certain solid polymer electrolyte fuel cells.

A relevant typical fuel cell comprises a solid polymer electrolyte, a cathode and an anode on opposite sides of the electrolyte, an oxidant flow field plate for an oxidant reactant on the side of the cathode opposite the electrolyte, and a fuel flow field plate for a fuel reactant on the side of the anode opposite the electrolyte. Further, at least one of the oxidant and fuel flow field plates comprises a plurality of reactant flow field channels, a reactant transition region, at least one reactant via having first and second ends, and a reactant port. In such a fuel cell, the plurality of reactant flow field channels is fluidly connected to the reactant transition region, the reactant transition region is fluidly connected to the first end of the at least one reactant via, and the second end of the at least one reactant via is fluidly connected to the reactant port.

In the present invention, the surface of the at least one reactant via in the reactant flow field plate is superhydrophobic, and the fuel cell comprises at least one additional via having first and second ends. The surface of the additional via is hydrophilic and the hydrophilic additional via is fluidly connected in parallel to the superhydrophobic reactant via such that the first end of the hydrophilic additional via is fluidly connected directly to the reactant transition region and the second end or at least one branch from the hydrophilic additional via is fluidly connected directly to the superhydrophobic reactant via. Further, the dimensions of the hydrophilic additional via are such that water appearing at its second end or the at least one branch will flow into the hydrophilic additional via by capillary action.

In one embodiment, the invention can be advantageously employed to remove water from a via at the oxidant outlet. In this embodiment, the oxidant flow field plate comprises a plurality of oxidant flow field channels, an oxidant outlet transition region, at least one oxidant outlet via, and an oxidant outlet port. Further, the plurality of oxidant flow field channels is fluidly connected to the oxidant outlet transition region, the oxidant outlet transition region is fluidly connected to the at least one oxidant outlet via, and the at least one oxidant outlet via is fluidly connected to the oxidant outlet port. In this embodiment then, a relevant plurality of reactant flow field channels is the plurality of oxidant flow field channels, the reactant transition region is the oxidant outlet transition region, the superhydrophobic reactant via is the at least one oxidant outlet via, and the reactant port is the oxidant outlet port.

In another embodiment, the invention can be advantageously employed to remove water from a via at the fuel outlet. In this embodiment, the fuel flow field plate comprises a plurality of fuel flow field channels, a fuel outlet transition region, at least one fuel outlet via, and a fuel outlet port. Further, the plurality of fuel flow field channels is fluidly connected to the fuel outlet transition region, the fuel outlet transition region is fluidly connected to the at least one fuel outlet via, and the at least one fuel outlet via is fluidly connected to the fuel outlet port. In this embodiment then, a relevant plurality of reactant flow field channels is the plurality of fuel flow field channels, the reactant transition region is the fuel outlet transition region, the superhydrophobic reactant via is the at least one fuel outlet via, and the reactant port is the fuel outlet port.

In yet other embodiments, the invention may be employed to remove water from a via at any or all of the oxidant and/or fuel outlets and inlets.

In a preferred embodiment, the first end of the hydrophilic additional via and the first end of the superhydrophobic reactant via (i.e. the ends that open into the transition region) are close to each other. For instance, the distance between the first end of the hydrophilic additional via and the first end of the superhydrophobic reactant via can desirably be less than two times the width of the channels in the plurality of reactant flow field channels.

In embodiments of the invention, at least one relevant dimension of the hydrophilic additional via is suitably small such that, for a given state of the via surfaces and a given operating temperature of the fuel cell, water appearing at the second end of the hydrophilic additional via will be drawn or flow into it by capillary action.

The hydrophilic additional via may be incorporated so as to be located completely in parallel to the superhydrophobic reactant via. That is, the second end of the hydrophilic additional via can be fluidly connected directly to the second end of the superhydrophobic reactant via. Alternatively however, the second end of the hydrophilic additional via may instead be fluidly connected to the superhydrophobic reactant via somewhere between its first and second ends.

The invention may also be employed in embodiments comprising a plurality of reactant vias. In such an embodiment, the fuel cell may comprise a plurality of reactant vias having first and second ends and whose surfaces are all superhydrophobic, and in which the reactant transition region is fluidly connected to the first ends of the plurality of superhydrophobic reactant vias and the second ends of the plurality of superhydrophobic reactant vias are fluidly connected to the reactant port. Further, such embodiments may then comprise a plurality of similar additional vias having first and second ends. That is, the surfaces of these additional vias may also be hydrophilic and each of the hydrophilic additional vias may be fluidly connected in parallel to one of the superhydrophobic reactant vias such that the first end of each of the hydrophilic additional vias is fluidly connected directly to the reactant transition region while the second end of each of the hydrophilic additional vias is fluidly connected directly to one of the superhydrophobic reactant vias. Further, the dimensions of the hydrophilic additional vias are such that water appearing at their second ends will flow into the respective hydrophilic additional vias by capillary action.

In any or all of the preceding embodiments, additional branches between the hydrophilic additional via/s and the superhydrophobic reactant via/s may be employed. For instance, the hydrophilic additional via can also be fluidly connected by at least one branch to the superhydrophobic reactant via between its first and second ends.

The invention may be used to advantage in various typical fuel cell constructions, including in fuel cells whose reactant transition region comprises structures selected from the group consisting of vanes and pillars, or in fuel cells in which the reactant port is near the periphery of the reactant flow field plate, or in fuel cells comprising gas diffusion layers—namely a cathode gas diffusion layer between the cathode and the oxidant flow field plate and an anode gas diffusion layer located between the anode and the fuel flow field plate, etc. Further, the invention may also be used in solid polymer electrolyte fuel cell stacks (i.e. a series stack of a plurality of solid polymer electrolyte fuel cells of the invention).

In methods of the invention then, water is removed from at least one reactant via in a relevant solid polymer electrolyte fuel cell by making the surface of the at least one reactant via superhydrophobic and by appropriately incorporating at least one additional via having first and second ends into the fuel cell. An appropriately incorporated additional via is characterized by a surface which is hydrophilic. Further, an appropriate hydrophilic additional via is fluidly connected in parallel to the superhydrophobic reactant via such that the first end of the hydrophilic additional via is fluidly connected directly to the reactant transition region while the second end or at least one branch from the hydrophilic additional via is fluidly connected directly to the superhydrophobic reactant via. Preferably, structures are incorporated in the transition region to direct fluid flow towards both the first end of the superhydrophobic reactant via and the first end of the hydrophilic additional via. Also preferably, the hydrophilic additional via is incorporated such that the distance between the first end of the hydrophilic additional via and the first end of the superhydrophobic reactant via is less than the width of the channels in the plurality of reactant flow field channels. Using suitable adaptions of the method, any of the aforementioned fuel cell features of the invention can desirably be obtained.

These and other aspects of the invention are evident upon reference to the attached Figures and following detailed description.

BRIEF DESCRIPTION OF THE DRAWINGS

FIG. 1b shows a magnified perspective view around the reactant transition region, reactant vias, and reactant port in the reactant flow field plate of FIG. 1a.

FIGS. 2a, 2b and 2c shows schematics of several options for fluidly connecting a hydrophilic additional via in parallel to a superhydrophobic reactant via in accordance with the invention. In FIG. 2a, the second end of the former is directly connected to the second end of the latter. In FIG. 2b, the second end of the former is directly connected between the first and second ends of the latter. In FIG. 2c, the second end of the former is connected as shown in FIG. 2a, but the embodiment here also comprises two additional branches connecting the two vias.

FIGS. 3a, 3b, 3c and 3d illustrate several exemplary embodiments of the invention in magnified perspective views similar to that shown in FIG. 1b. In FIG. 3a, the embodiment comprises a plurality of reactant vias with a single hydrophilic additional via incorporated in a like manner to that shown in FIG. 2c. FIG. 3b shows a close-up view of FIG. 3a.

FIGS. 4a, 4b illustrate the results of a simulated calculation in which the water movement inside a superhydrophobic reactant via, inside a hydrophilic additional via and inside the second ends which fluidly connect them was simulated.

DETAILED DESCRIPTION

In this specification, words such as "a" and "comprises" are to be construed in an open-ended sense and are to be considered as meaning at least one but not limited to just one.

Herein, in a quantitative context, the term "about" should be construed as being in the range up to plus 10% and down to minus 10%.

The tell "hydrophilic" refers to surfaces that are characterized by contact angles with water of less than 90 degrees.

The term "hydrophobic" refers to surfaces that are characterized by contact angles with water of more than 90 degrees.

The term "superhydrophilic" refers to surfaces that are characterized by contact angles with water of less than 30 degrees.

The term "superhydrophobic" refers to surfaces that are characterized by contact angles with water of greater than 150 degrees.

When used in the context of a fluid connection made between two elements, the term "directly" refers to a connection in which the first of the two elements is fluidly connected to the second of the two elements without any other element appearing between the two.

Figure 1A:
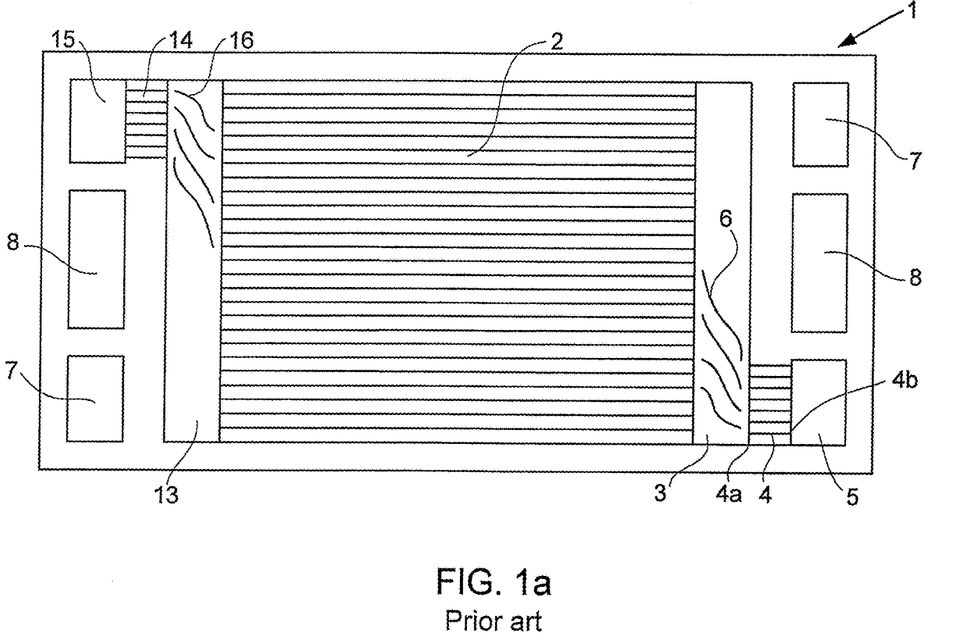
FIG. 1a shows a top view of a typical reactant flow field plate in a solid polymer electrolyte fuel cell stack of the prior art intended for use in automotive applications.

A simplified top view of a typical reactant flow field plate used in a solid polymer electrolyte fuel cell stack suitable for automotive applications and relevant to the present invention is shown in FIG. 1a. Reactant flow field plate 1 comprises a plurality of reactant flow field channels 2 (shown here as a series of parallel, linear channels separated by landings), reactant transition region 3, at least one reactant via 4 (shown here as a plurality of parallel, linear reactant vias 4), and reactant port 5 near the periphery of reactant flow field plate 1 (e.g. such that only a seal separates reactant port 5 from the periphery). The plurality of reactant flow field channels 2 is fluidly connected to reactant transition region 3. In turn, reactant transition region 3 is fluidly connected to first ends 4a of reactant vias 4. The other or second ends 4b of reactant vias 4 are fluidly connected to reactant port 5. In FIG. 1a, reactant transition region 3 is shown as comprising a plurality of vanes 6 which are provided to appropriately guide fluid reactant between reactant flow field channels 2 and the numerous first ends 4a of reactant vias 4.

Also visible in FIG. 1a is another port for the reactant, namely reactant port 15. And associated therewith and also visible in FIG. 1a is another reactant transition region 13 and another plurality of reactant vias 14 which are fluidly connected to each other and to reactant flow field channels 2 and reactant port 15 in a like manner to how reactant flow field channels 2, reactant transition region 3, reactant vias 4, and reactant port 5 are connected. Further, reactant transition region 13 comprises a plurality of vanes 16 which are similar to vanes 6 in reactant transition region 3. Moreover, reactant ports 7 are present for the second reactant needed for operating the polymer electrolyte fuel cell. Reactant ports 7 may be designed for a fuel, such as hydrogen, and reactant ports 5 may be designed for oxidant, such as air, or vice versa. Finally, coolant ports 8 are visible in FIG. 1a for allowing coolant to access a coolant flow field (which is typically on the opposite side of reactant flow field plate 1 and thus not visible in FIG. 1a).

Figure 1B:
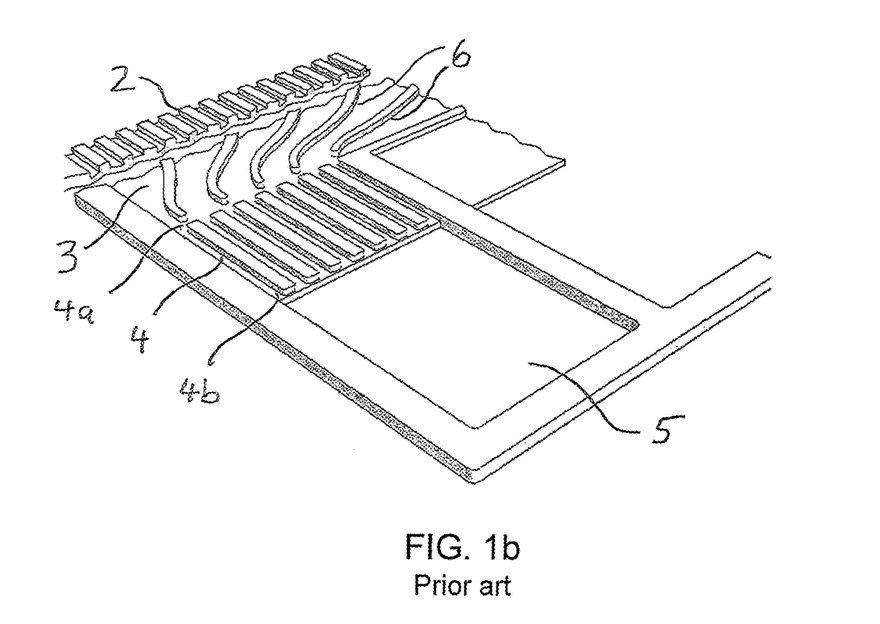

FIG. 1b shows a magnified perspective view around reactant transition region 3, reactant vias 4, and reactant port 5 in the reactant flow field plate 1 of FIG. 1a.

Under certain conditions during fuel cell operation, water can collect in these small reactant vias 4 and adversely affect fluid flow and subsequent fuel cell operation. To address this, purging procedures are commonly employed to clear accumulated water from the affected fluid passages (i.e. where a substantial flow of an appropriate fluid is used to "purge" the passage of water). However, purging procedures are not always completely effective. Further, sometimes after fuel cell shutdown and purging procedures, water droplets may spontaneously move back into reactant vias 4. Under below freezing conditions, this water could turn to ice and completely block the affected vias, thereby causing startup problems later.

In the present invention, water is prevented from collecting in and blocking reactant vias in this manner. This is accomplished by incorporating an additional via or vias in which this water is collected instead. The additional via is arranged so it is fluidly connected in parallel to the reactant via or vias in which problematic water may collect. The surface of the reactant via is made to be superhydrophobic while the surface of the additional via is made hydrophilic. Thus water preferentially contacts the additional via surface and not the reactant via surface. Further, the dimensions of the additional via are selected such that any water appearing in the reactant via is drawn into the additional via by capillary action.

Figure 2A:
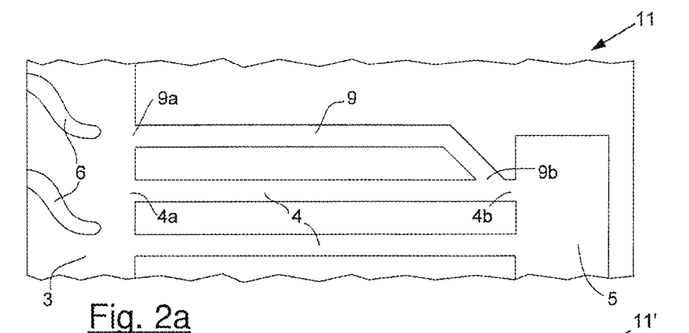

FIG. 2a shows a schematic of an exemplary arrangement for incorporating a suitable additional via in accordance with the invention in the reactant flow field plate of FIG. 1a. (Note that in FIG. 2a and the other following figures, the same numbering has been used to identify those features common to FIGS. 1a and 1b.) In reactant flow field plate 11 in FIG. 2a, additional via 9 is fluidly connected in parallel to reactant via 4 such that first end 9a of additional via 9 is connected directly to reactant transition region 3, while second end 9b is connected directly to second end 4b of reactant via 4. As mentioned above, the surface of reactant via 4 is made to be superhydrophobic while the surface of additional via 9 is made to be hydrophilic.

Figure 2B:
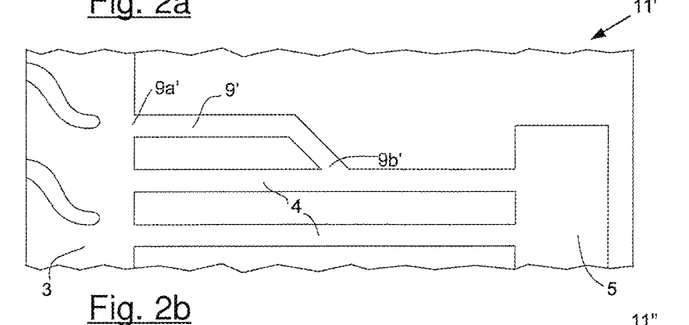

An alternative arrangement for incorporating a suitable additional via in accordance with the invention is shown in FIG. 2b. Here, in reactant flow field plate 11', additional via 9' is fluidly connected in parallel to reactant via 4 such that first end 9a' of additional via 9' is again connected directly to reactant transition region 3. Here however, second end 9b' is connected directly to reactant via 4 partway between its first and second ends (i.e. partway between 4a and 4b). Again, the surface of reactant via 4 is made to be superhydrophobic while the surface of additional via 9' is made to be hydrophilic.

Figure 2C:
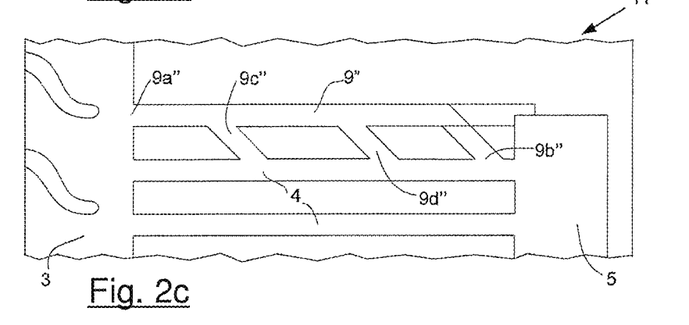

A yet further optional arrangement for incorporating a suitable additional via in accordance with the invention is shown in FIG. 2c. Here, in reactant flow field plate 11", additional via 9" is fluidly connected in parallel to reactant via 4 in a like manner as is shown in FIG. 2a. That is, first end 9a" of additional via 9" is connected directly to reactant transition region 3, while second end 9b" is connected directly to second end 4b of reactant via 4. Here however, additional via 9" is also fluidly connected to reactant via 4 between its first and second ends by two branches, namely branch 9c" and branch 9d". As above, the surface of reactant via 4 is made to be superhydrophobic while the surface of additional via 9" is made to be hydrophilic. In an optional embodiment thereof the second end 9b" of the additional via could be connected directly to the reactant port 5 (shown in FIG. 2c with a dotted line).

In all the embodiments of FIGS. 2a to 2c, the dimensions of the hydrophilic additional vias 9, 9', and 9" are selected such that water appearing at second ends 9b, 9b', and 9b" would be drawn into the additional vias by capillary action. Preferably the same is true at the branches, namely the dimensions of the branches 9c" and 9d" are selected such that any water appearing in their vicinity would also be drawn into the additional vias by capillary action. If the the second end 9b" of the additional via is connected directly to the reactant port 5 (as described above) the water will be drawn into the additional via 9" through the branches 9c" and 9d". As those skilled in the art readily appreciate, the dimensions required for capillary action to occur are functions of several factors including the hydrophobicity (or contact angle) of the relevant surfaces but also the surface tension of the fluid involved, which in turn is a function of temperature. Solid polymer fuel cells may be stored and operated over temperatures ranging from lows of about −40° C. to highs of about +100° C. Thus, the additional via dimensions and geometry should be selected with these factors in mind in order to obtain the desired functionality over the entire operating range of the fuel cell. It is expected that suitable such selections can readily be made by those skilled in the art for a given set of characteristics. Generally it is expected that the additional via dimensions will be about the same or smaller than those of typical reactant vias, e.g. millimeters or less and/or of order of the thickness of the reactant flow field plates.

In embodiments of the invention, it also is generally desirable for the first end of the hydrophilic additional via and the first end of the superhydrophobic reactant via (i.e. the ends that open into the transition region) to be close to each other. For instance, the distance between the first end of the hydrophilic additional via and the first end of the superhydrophobic reactant via can desirably be less than two times the width of the channels in the plurality of reactant flow field channels.

With regards to obtaining the desired surface characteristics for the reactant and additional vias involved in the invention, various coatings and techniques are known in the art such that the desired hydrophobicities can be obtained on the materials commonly used as reactant flow field plates. In particular, the science and engineering relating to superhydrophobic surfaces has advanced recently and correspondingly new options have been identified (e.g. transparent nano composite, perfluoropolyether, and/or amorphous silicate-nano particle modified coatings from Fraunhofer IFAM or as disclosed for instance in U.S. Pat. No. 9,279,073, "A review of the recent advances in superhydrophobic surfaces and the emerging energy-related applications" P. Zhang et al., Energy 82 (2015) 1068e1087; and/or "Recent advances in the mechanical durability of superhydrophobic materials", A. Milionis et al., Advances in Colloid and Interface Science 229 (2016) 57-79).

Figure 3A:
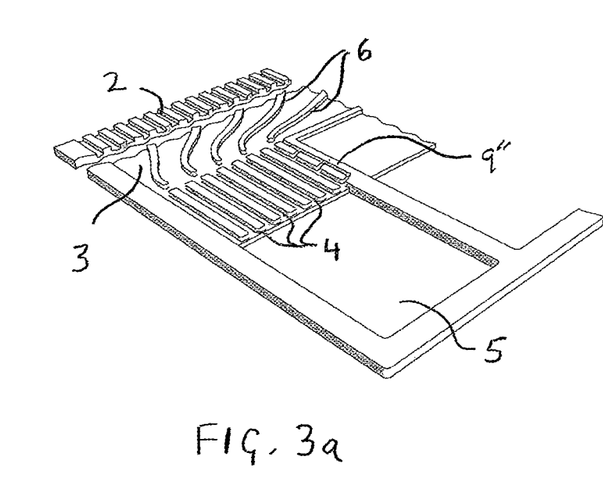
Figure 3B:
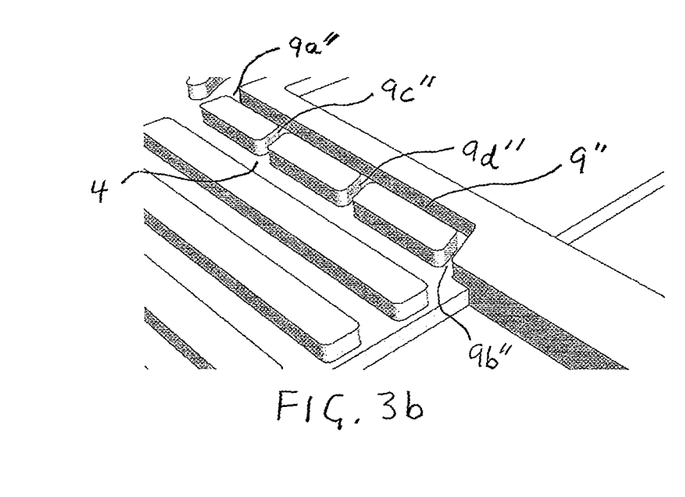
Figure 3C:
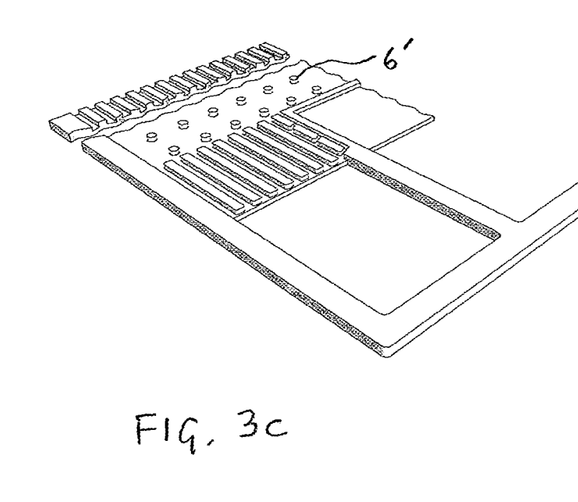
FIG. 3c shows a similar embodiment to that of FIG. 3a except that the reactant transition region comprises pillars instead of vanes to direct fluid to the ends of the vias.
Figure 3D:
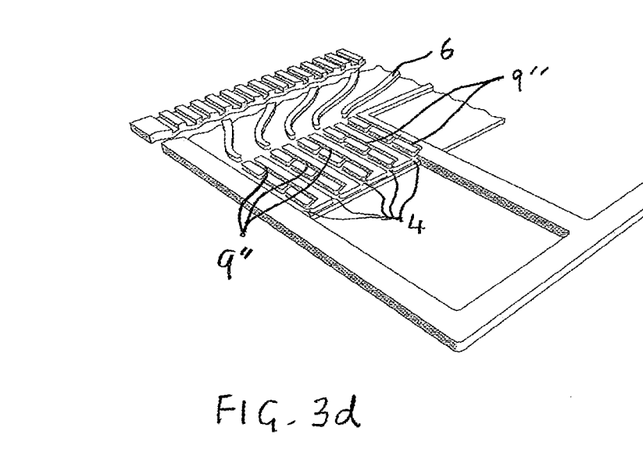
FIG. 3d shows a similar embodiment to that of FIG. 3a except that a plurality of hydrophilic additional vias have been incorporated.

FIGS. 3a, 3b, 3c and 3d illustrate several exemplary embodiments of the invention as applied to a reactant flow field plate similar to that shown in FIG. 1b (again magnified perspective views are shown). The embodiment in FIG. 3a comprises a plurality of reactant vias 4 but has just a single hydrophilic additional via 9" incorporated in a like manner to that shown in FIG. 2c. This embodiment may be considered if water collection is only a significant problem or concern on the innermost reactant via 4, or perhaps if it is only considered necessary to ensure that one reactant via remains clear of water. FIG. 3b shows a close-up view of FIG. 3a where both ends (9a" and 9b") and both branches (9c" and 9d") of additional via 9" can be clearly seen. FIG. 3c shows a similar embodiment to that of FIG. 3a except that the reactant transition region comprises pillars 6' instead of vanes 6 to direct reactant fluid to the first ends of the reactant vias and to the first end of the additional via. FIG. 3d shows a similar embodiment to that of FIG. 3a except that a plurality of hydrophilic additional vias 9" have been incorporated. Specifically, one additional via 9" has been incorporated for each reactant via 4 present. In this way, water collection in every reactant via 4 can be addressed using the method of the invention.

Figure 4A:
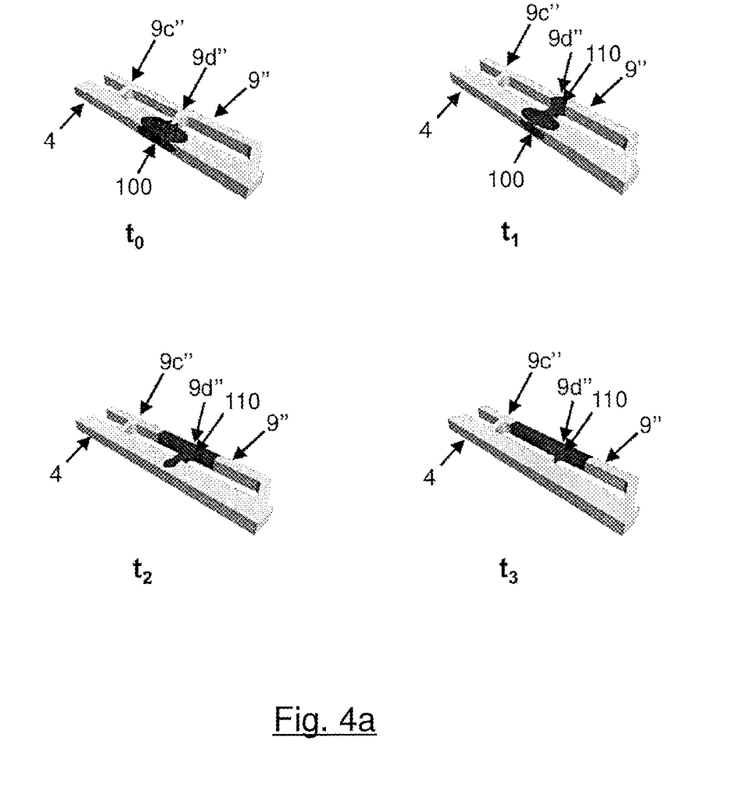
FIG. 4a illustrates phase 1, i.e. a situation in which the inventive embodiment of FIG. 3a is assembled in a solid polymer electrolyte fuel cell during operation of the fuel cell: Water accumulated inside the superhydrophobic reactant via is drawn into the hydrophilic additional via.
Figure 4B:
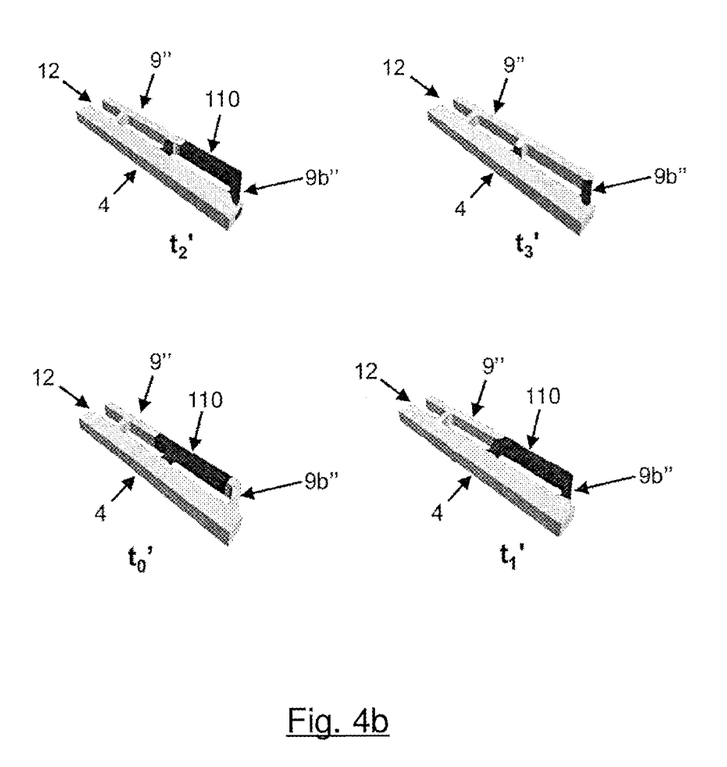
FIG. 4b illustrates phase 2, i.e. again a situation in which the inventive embodiment of FIG. 3a is assembled in a solid polymer electrolyte fuel cell. But this time, the fuel cell is in the state of startup: A flow of reactant gas coming from the transition region clears the hydrophilic additional via and blows out water which had accumulated inside it.

As mentioned above, FIGS. 4a, 4b illustrate the results of a simulated calculation in which the water movement inside a superhydrophobic reactant via (4), inside a hydrophilic additional via (9") and inside the second ends (9b", 9c", 9d") which fluidly connect vias (4) and (9") was simulated. FIGS. 4a, 4b are based on the inventive embodiment of FIG. 3a (see also the related close-up view, i.e. FIG. 3b). Parameters of that simulation are listed in Table 1:

TABLE 1

|  | Width (mm) | Depth (mm) | Contact Angle (deg) | Reynolds Number (Phase 2) |
|---|---|---|---|---|
| Via | 1.0 | 0.5 | 150 | 270 |
| Additional via | 0.5 | 0.5 | 70 | 400 |

FIG. 4a illustrates phase 1, i.e. a situation in which the inventive embodiment of FIG. 3a is assembled in a solid polymer electrolyte fuel cell during operation of the fuel cell. $t_0$ illustrates the situation at the beginning of the simulation: A drop of water (100) has accumulated inside superhydrophobic reactant via (4) and clogs it. A performance loss of the fuel cell would be the consequence of this scenario. At time $t_1$, the water drop (100) started moving through branch (9d") to hydrophilic additional via (9"), driven by capillary action. A new water drop (110) formed, already. At time $t_2$, new water drop (110) grew and almost all of the water has left superhydrophobic reactant via (4). Finally, at the end of the simulation, at time $t_3$, former water drop (100) is completely sucked into hydrophilic via (9"), forming new water drop (110), and superhydrophobic reactant via (4) is clear of water. The clogging of superhydrophobic reactant via (4) was removed and no performance loss of the fuel cell has to be feared.

FIG. 4b illustrates phase 2, i.e. again a situation in which the inventive embodiment of FIG. 3a is assembled in a solid polymer electrolyte fuel cell. In this simulation, however, the fuel cell is in the state of startup: A flow of reactant gas (12) coming from the transition region (3) clears the hydrophilic additional via (9") and blows out (removes or purges) water which had accumulated inside it. In detail, $t_0'$ illustrates the situation at the beginning of the simulation: New water drop (110) has accumulated inside hydrophilic additional via (9") and a flow of reactant gas (12) comes from transition region (3). At time $t_1'$, water drop (110) started moving inside branch (9b") towards port (5) and the outlet (both not illustrated in FIG. 4b), shoved along by flow (12). At time $t_2'$ the removal of water from hydrophilic additional via (9") proceeded and some of the water left it, already. Finally, at the end of the simulation, at time $t_3'$, most of the water has left hydrophilic additional via (9") and only a small amount of water remained in branch (9b"). In this status, hydrophilic additional via (9") is ready to suck of water from superhydrophobic reactant via (4), again, so that the process as described above in the context of FIG. 4a can start once again.

The present invention may be employed in association with vias for either reactant (i.e. for either oxidant and/or fuel) and for either reactant's inlet or outlet. The present invention is however particularly suitable for use at either the oxidant or fuel outlet ports where significant water can commonly collect. If the invention is to be used at an oxidant outlet port, the relevant reactant flow field plate is an oxidant flow field plate, the relevant reactant flow field channels would be oxidant flow field channels, the relevant reactant transition region would be the oxidant outlet transition region, the relevant reactant vias would be the oxidant outlet vias, and the relevant reactant port would of course be the oxidant outlet port. If the invention is to be used at a fuel outlet port, the relevant reactant flow field plate is a fuel flow field plate, the relevant reactant flow field channels would be fuel flow field channels, the relevant reactant transition region would be the fuel outlet transition region, the relevant reactant vias would be the fuel outlet vias, and the relevant reactant port would of course be the fuel outlet port.

When the invention is used at a reactant outlet, the structures in the reactant transition region (e.g. vanes 6 or pillars 6' in FIGS. 3a-3d) are preferably shaped and located to control the reactant flow pattern upstream of reactant and additional vias. Preferably for instance, during a startup of the fuel cell, the flowrate in the additional via is high enough to remove (purge) any accumulated water from the previous shutdown. To control the flowrate, these structures are thus designed and positioned just upstream of the vias so as to split the flow therebetween in a desired manner.

Use of the present invention provides for enhanced water removal in solid polymer electrolyte fuel cells. Water is repelled from reactant vias 4 during normal fuel cell operation and purging procedures as a result of their superhydrophobic surfaces. Further though, there is little to no water uptake into reactant vias 4 subsequent to purging since any water is instead drawn into additional vias 9. In subzero temperature conditions, blockage of vias 4 by ice formation is thus prevented. By proper design, additional vias 9 can be readily cleared by reactant or other appropriate fluid flows.

Manufacture of reactant flow field plates in accordance with the invention is expected to be relatively easy and straightforward. Appropriately designed additional vias 9 may be incorporated in a like manner to how conventional reactant vias 4 are formed in the manufacturing process. And the required hydrophobicity of the foffued features can thereafter be obtained by use of one or more techniques known to those skilled in the art. Such flow field plates are therefore expected to be quite durable and to maintain functionality over long operating periods and numerous startup/shutdown cycles (e.g. with functionality being maintained as long as the hydrophobicity characteristics of the features are maintained).

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, the invention is particularly useful for water management in the oxidant outlet passages of solid polymer electrolyte fuel cell stacks. However, it may also be useful in the fuel outlet passages and/or inlets of such fuel cell stacks as well. Such modifications are to be considered within the purview and scope of the claims appended hereto.

What is claimed is:

1. A solid polymer electrolyte fuel cell comprising:
   a solid polymer electrolyte;
   a cathode and an anode on opposite sides of the electrolyte;
   an oxidant flow field plate for an oxidant reactant on the side of the cathode opposite the electrolyte; and
   a fuel flow field plate for a fuel reactant on the side of the anode opposite the electrolyte;
   wherein at least one of the oxidant and fuel flow field plates comprises a plurality of reactant flow field channels, a reactant transition region, at least one reactant via having first and second ends, and a reactant port;

and wherein the plurality of reactant flow field channels is fluidly connected to the reactant transition region, the reactant transition region is fluidly connected to the first end of the at least one reactant via, and the second end of the at least one reactant via is fluidly connected to the reactant port;

characterized in that:
the surface of the at least one reactant via in the reactant flow field plate is superhydrophobic; and
the fuel cell comprises at least one additional via having first and second ends wherein:
the surface of the additional via is hydrophilic;
the hydrophilic additional via is fluidly connected in parallel to the superhydrophobic reactant via such that the first end of the hydrophilic additional via is fluidly connected directly to the reactant transition region and the second end or at least one branch from the hydrophilic additional via is fluidly connected directly to the superhydrophobic reactant via; and
the dimensions of the hydrophilic additional via are such that water appearing at its second end or the at least one branch will flow into the hydrophilic additional via by capillary action.

2. The fuel cell of claim 1 wherein:
the oxidant flow field plate comprises a plurality of oxidant flow field channels, an oxidant outlet transition region, at least one oxidant outlet via, and an oxidant outlet port wherein the plurality of oxidant flow field channels is fluidly connected to the oxidant outlet transition region, the oxidant outlet transition region is fluidly connected to the at least one oxidant outlet via, and the at least one oxidant outlet via is fluidly connected to the oxidant outlet port;
wherein the plurality of reactant flow field channels is the plurality of oxidant flow field channels, the reactant transition region is the oxidant outlet transition region, the superhydrophobic reactant via is the oxidant outlet via, and the reactant port is the oxidant outlet port.

3. The fuel cell of claim 1 wherein:
the fuel flow field plate comprises a plurality of fuel flow field channels, a fuel outlet transition region, at least one fuel outlet via, and a fuel outlet port wherein the plurality of fuel flow field channels is fluidly connected to the fuel outlet transition region, the fuel outlet transition region is fluidly connected to the at least one fuel outlet via, and the at least one fuel outlet via is fluidly connected to the fuel outlet port;
wherein the plurality of reactant flow field channels is the plurality of fuel flow field channels, the reactant transition region is the fuel outlet transition region, the superhydrophobic reactant via is the fuel outlet via, and the reactant port is the fuel outlet port.

4. The fuel cell of claim 1 wherein the distance between the first end of the hydrophilic additional via and the first end of the superhydrophobic reactant via is less than two times the width of the channels in the plurality of reactant flow field channels.

5. The fuel cell of claim 1 wherein the width dimension of the hydrophilic additional via is less than or about equal to the width dimension of the superhydrophobic reactant via.

6. The fuel cell of claim 1 wherein the second end of the hydrophilic additional via is fluidly connected directly to the second end of the superhydrophobic reactant via.

7. The fuel cell of claim 1 comprising a plurality of reactant vias having first and second ends and whose surfaces are superhydrophobic wherein the reactant transition region is fluidly connected to the first ends of the plurality of superhydrophobic reactant vias and the second ends of the plurality of superhydrophobic reactant vias are fluidly connected to the reactant port.

8. The fuel cell of claim 7 comprising a plurality of additional vias having first and second ends wherein:
the surfaces of the additional vias are hydrophilic;
each of the hydrophilic additional vias is fluidly connected in parallel to one of the superhydrophobic reactant vias such that the first end of each of the hydrophilic additional vias is fluidly connected directly to the reactant transition region and the second end of each of the hydrophilic additional vias is fluidly connected directly to one of the superhydrophobic reactant vias; and
the dimensions of the hydrophilic additional vias are such that water appearing at their second ends will flow into the hydrophilic additional vias by capillary action.

9. The fuel cell of claim 1 wherein the hydrophilic additional via is also fluidly connected by at least one branch to the superhydrophobic reactant via between its first and second ends.

10. The fuel cell of claim 1 wherein the reactant transition region comprises structures selected from the group consisting of vanes and pillars.

11. The fuel cell of claim 1 wherein the reactant port is near the periphery of the reactant flow field plate.

12. The fuel cell of claim 1 wherein the fuel cell comprises a cathode gas diffusion layer between the cathode and the oxidant flow field plate and an anode gas diffusion layer located between the anode and the fuel flow field plate.

13. A solid polymer electrolyte fuel cell stack comprising a series stack of a plurality of the solid polymer electrolyte fuel cells of claim 1.

14. A method for removing water from at least one reactant via in a solid polymer electrolyte fuel cell, the fuel cell comprising a solid polymer electrolyte, a cathode and an anode on opposite sides of the electrolyte, an oxidant flow field plate for an oxidant reactant on the side of the cathode opposite the electrolyte, and a fuel flow field plate for a fuel reactant on the side of the anode opposite the electrolyte, wherein at least one of the oxidant and fuel flow field plates comprises a plurality of reactant flow field channels, a reactant transition region, the at least one reactant via having first and second ends, and a reactant port; and wherein the plurality of reactant flow field channels is fluidly connected to the reactant transition region, the reactant transition region is fluidly connected to the first end of the at least one reactant via, and the second end of the at least one reactant via is fluidly connected to the reactant port, the method comprising:
making the surface of the at least one reactant via superhydrophobic; and
incorporating at least one additional via having first and second ends into the fuel cell wherein:
the surface of the additional via is hydrophilic;
the hydrophilic additional via is fluidly connected in parallel to the superhydrophobic reactant via such that the first end of the hydrophilic additional via is fluidly connected directly to the reactant transition region and the second end or at least one branch from the hydrophilic additional via is fluidly connected directly to the superhydrophobic reactant via; and
the dimensions of the hydrophilic additional via are such that water appearing at its second end or the at least one branch will flow into the hydrophilic additional via by capillary action.

15. The method of claim 14 wherein structures are incorporated in the reactant transition region to direct fluid flow towards the first end of the superhydrophobic reactant via and the first end of the hydrophilic additional via.

16. The method of claim 14 wherein the hydrophilic additional via is incorporated such that the distance between the first end of the hydrophilic additional via and the first end of the superhydrophobic reactant via is less than the width of the channels in the plurality of reactant flow field channels.

17. The method of claim 14 wherein the hydrophilic additional via is incorporated such that its second end is fluidly connected directly to the second end of the superhydrophobic reactant via.

18. The method of claim 14 wherein the fuel cell comprises a plurality of reactant vias having first and second ends and whose surfaces are superhydrophobic, wherein the reactant transition region is fluidly connected to the first ends of the plurality of superhydrophobic reactant vias and the second ends of the plurality of superhydrophobic reactant vias are fluidly connected to the reactant port, the method additionally comprising:

incorporating a plurality of additional vias having first and second ends into the fuel cell wherein:

the surfaces of the additional vias are hydrophilic;

each of the hydrophilic additional vias is fluidly connected in parallel to one of the superhydrophobic reactant vias such that the first end of each of the hydrophilic additional vias is fluidly connected directly to the reactant transition region and the second end of each of the hydrophilic additional vias is fluidly connected directly to one of the superhydrophobic reactant vias; and the dimensions of the hydrophilic additional vias are such that water appearing at their second ends will flow into the hydrophilic additional vias by capillary action.

19. The method of claim 14 comprising incorporating at least one branch fluidly connecting the hydrophilic additional via to the superhydrophobic reactant via between its first and second ends.

* * * * *